May 9, 1961 R. D. KIRK 2,983,522
STEERING MECHANISM FOR CHILD'S VEHICLE OR THE LIKE
Filed March 15, 1960
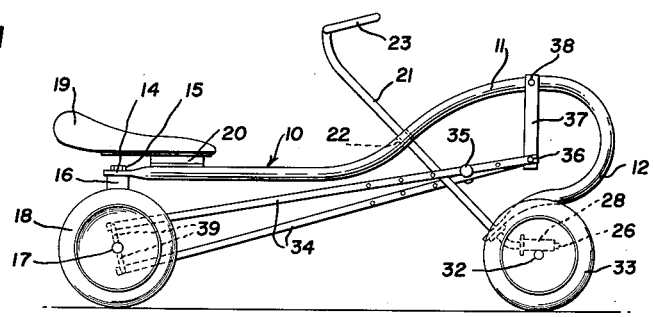
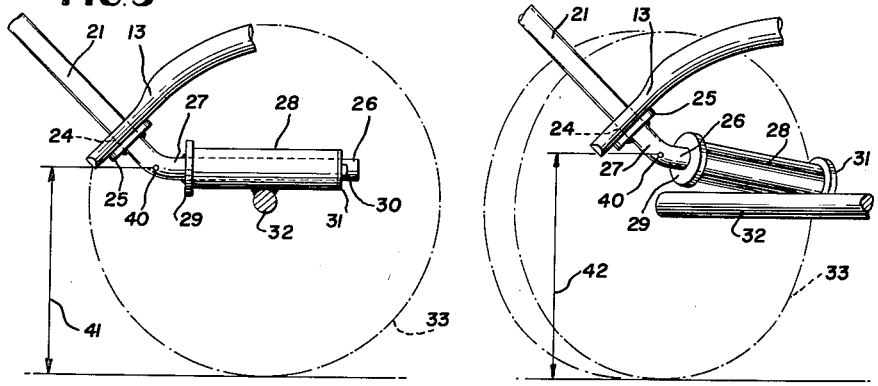
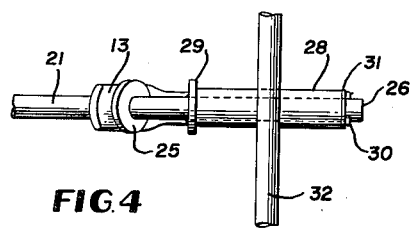
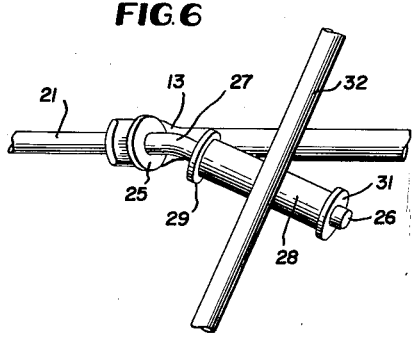
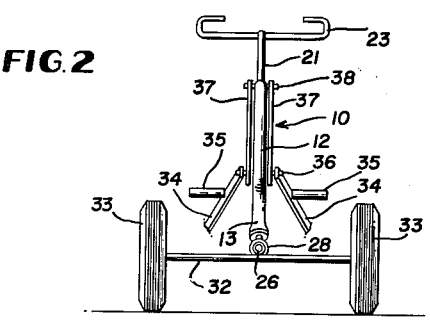
INVENTOR.
RALPH D. KIRK
BY
ATTORNEY United States Patent Office 2,983,522
Patented May 9, 1961

2,983,522
STEERING MECHANISM FOR CHILD'S VEHICLE OR THE LIKE
Ralph D. Kirk, 201 Lloyd Ave., Easley, S.C.
Filed Mar. 15, 1960, Ser. No. 15,144
5 Claims. (Cl. 280—267)

This invention relates to a steering mechanism for a child's vehicle or the like.

An object of the invention is to provide a highly simplified steering mechanism for a child's pedal-type vehicle, and which steering mechanism is very inexpensive to manufacture, easy to assemble with other parts of the vehicle, compact for packaging when the vehicle is in a knocked-down condition, and reliable and efficient in operation.

A further object is to provide a steering mechanism of the above-mentioned character which is substantially self-centering in operation.

Another object of the invention is to provide a steering mechanism embodying a minimum number of moving parts which coact with the frame of the vehicle and the front steering axle thereof in a novel manner to support and steer the vehicle.

Other objects and advantages of the invention will be apparent during the course of the following description.

In the accompaniyng drawings forming a part of this application and in which like numerals are employed to designate like parts throughout the same, Figure 1 is a side elevation of a child's vehicle having the steering mechanism embodying the invention, Figure 2 is a front elevation of the vehicle with parts omitted, Figure 3 is an enlarged fragmentary side elevation of the steering mechanism with parts omitted and parts in section, Figure 4 is a bottom plan view of the mechanism shown in Figure 3, Figure 5 is a further fragmentary side elevation of the mechanism shown in Figure 3 but with the parts adjusted for turning the front axle of the vehicle in one idrection from center, Figure 6 is a fragmentary bottom plan view of the mechanism illustrated in Figure 5.

In the drawings, wherein for the purpose of illustration is shown a preferred embodiment of the invention, the numeral 10 designates a generally horizontal longitudinal frame bar, having an elevated curved forward portion 11 and a depending reversely curved vertical portion 12, terminating in a downwardly and rearwardly inclined front terminal portion 13, preferably arranged at about forty-five degrees to the horizontal, all such parts of the frame bar 10 being integrally connected, as shown in the drawings.

The rear terminal end 14 of frame bar 10 is rigidly secured at 15 to an upstanding yoke or support 16, supported by rear axle 17, having rear ground engaging wheels 18. One wheel 18 may be freely rotatably mounted upon the rear axle 17, while the other rear wheel is rigid with the axle for driving the vehicle, when rotation is imparted to the rear axle 17.

A suitable seat 19 is rigidly mounted at 20 upon the frame bar 10, and this seat may be made adjustable vertically, forwardly and rearwardly, in a conventional manner.

An inclined steering column 21, preferably arranged at about forty-five degrees to the horizontal extends through an opening 22 in the curved portion 11 of frame bar 10 and is journaled therein for rotation, and the steering column is provided at its top with suitable hand turning means 23, in the nature of a steering wheel.

The lower portion of the steering column 21 is also freely journaled for rotation within an opening 24, formed through the inclined terminal portion 13 of the frame bar 10. A collar or washer 25, rigidly secured to the lower portion of the steering column 21 by welding or the like bears against the bottom of the terminal extension 13 to support the latter against downward movement on the inclined steering column 21.

Below the rigid collar 25 and frame extension 13, the inclined steering column carries a forwardly projecting relatively short horizontal longitudinal extension 26, integral therewith, and joined thereto by a bend 27. A sleeve 28 is freely rotatably mounted upon the horizontal extension 26 and is held against rearward endwise movement by a collar or washer 29, rigidly secured by welding or the like to the extension 26 just forwardly of the bend 27. A cotter key 30 and flat washer 31 prevent forward axial movement of the sleeve 28 upon the steering column extension 26, as shown.

Underlying the sleeve 28 near the longitudinal center of the sleeve and extension 26 and extending at right angles thereto is a front transverse horizontal steering axle 32, rigidly secured to the bottom of the sleeve 28 by welding or the like. Front ground engaging wheels 33 are freely journaled upon opposite ends of the axle 32, as shown. The steering column extension 26 is freely turnable inside of sleeve 28, and the sleeve is rigid with the axle 32, as stated. The inclined steering column 21 is also freely turnable within the opening of the inclined frame extension 13 and the opening 22 of frame portion 11.

A pair of longitudinally extending somewhat inclined pedal bars 34 having adjustable pedals 35 have their forward converging ends pivoted at 36 to depending vertically swingable links 37, having their tops pivoted at 38 to the opposite sides of the raised frame portion 11. The rear ends of pedal bars 34 are pivotally connected with cranks 39, formed upon the rear axle 17. The pedal mechanism is conventional and needs no further description. The steering column 21 extends between forward portions of the pedal bars 34, as shown.

The operation of the steering mechanism is as follows:

The steering wheel means 23 is turned in the usual manner, in either direction, for turning the inclined steering column 21 upon its longitudinal axis within the openings 22 and 24. When the steering column is thus turned, the extension 26 rotates inside of the sleeve 28, and causes the sleeve to rock somewhat vertically and to turn the front axle 32 forwardly or clockwise somewhat upon its longitudinal axis. Simultaneously, the front axle 32 swings or turns horizontally for steering the vehicle in one direction or another, depending upon which way the steering column is turned manually.

When the steering column 21 is turned, as above-described, the extension 26 swings downwardly to one side or the other of center in a conical path, and the vertex of the cone generated by the swinging extension 26 is indicated diagrammatically at 40 in Figures 3 and 5. This conical swinging movement downwardly and to the right or left of center by the extension 26, journaled within the sleeve 18, causes the above-described partial rotation of the front axle 32 and also tends to force the front axle downwardly toward the ground. The front axle 32 cannot shift downwardly due to the contact of the front wheels 33 with the ground. Consequently, when the steering column 21 is turned in either direction away from center, and the described partial conical path is generated by the extension 26, the rear portion of such extension and the bend 27 and the entire steering column is elevated somewhat vertically from its initial position when the steering column is centered. This elevating of the steering column, Figure 5, causes the entire front portion of the frame bar 10 to be elevated due to the engagement of the rigid collar 25 against the bottom of the extension 13 of the frame bar. The relative vertical positions of the frame extension 13 and the vertex 40 of the imaginary cone generated by the extension 26 are indicated by the two lines 41 and 42 in Figures 3 and 5.

The entire weight of the forward end of the vehicle is carried by the steering column 21, and through this column by the axle 32, and consequently, when the steering wheel 23 is released after being turned in either direction away from center, the weight of the vehicle and its rider will tend to return the steering column 21 and front axle 32 automatically to the straight ahead or centered position indicated in Figure 3.

In other words, whenever the steering column 21 is turned in either direction away from center, there is a slight elevation of the forward end of frame bar 10 due to the elevation of the collar 25 when the extension 26 of the steering column swings through the described conical path and causes the mentioned turning of the front axle 32 upon its longitudinal axis, as well as horizontal swinging of the front axle to steer the vehicle in the desired direction. The front axle 32 is substantially self-centering under the weight of the vehicle and its rider, as previously stated.

An advantage inherent in the above mode of operation resides in the fact that when the front axle 32 is swung in either direction for steering the vehicle, and the vehicle frame rises, additional clearance is provided between the front wheels 33 and the foot pedals 35 during turning.

While I have illustrated the extension 26 and sleeve 28 as being horizontal when centered, Figure 3, and arranged substantially at 135 degrees to the inclined steering column 21, it should be understood that this angular relationship between the steering column and the extension 26 may be varied, if desired. By so varying this angular relationship, the steering ratio may be changed through a considerable range as found desirable. When the extension 26 forms an angle of about 135 degrees with the column 21, the front axle 32 will be swung or turned horizontally about 0.7 degree for each one degree of turning of the steering wheel 23 and steering column 21. This ratio may be increased upwardly by decreasing the angle between the extension 26 and column 21, and the steering ratio may be decreased by providing a greater included angle between the extension 26 and the steering column 21.

The steering action achieved with the above mechanism is very positive with no lost motion. The mechanism is cheap to manufacture, sturdy and durable, and reliable in operation.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. In a child's vehicle or the like, a frame member including a generally horizontal portion and an inclined portion, wheel means secured to and supporting said horizontal portion of the frame member, a horizontally swingable and turnable steering axle, ground engaging wheels supporting said axle, a sleeve extending transversely of said axle near the longitudinal center thereof and rigid therewith, said sleeve being generally horizontal, an inclined steering column journaled upon said inclined portion of the frame member for rotation and having a steering wheel part, an element fixedly secured to the inclined steering column below said inclined frame portion and engageable therewith to prevent downward movement of the inclined frame portion upon said steering column, and an extension secured to said steering column and forming an obtuse angle therewith and being journaled within said sleeve.

2. In a child's vehicle or the like, a frame member having an inclined part, an inclined steering column journaled upon said frame part for rotation, an element secured to said steering column and engaging said frame part to prevent movement of the latter longitudinally of the steering column in one direction, a generally horizontal extension secured to the steering column and arranged at an obtuse angle thereto and extending forwardly thereof, a sleeve receiving said steering column extension rotatably, a horizontally swingable steering axle extending substantially at right angles to said sleeve and rigidly secured thereto to swing and turn therewith when said sleeve generates a substantially conical path due to turning of said steering column and extension, and ground engaging wheels journaled upon said steering axle.

3. Steering means for a child's vehicle or the like, said vehicle having a frame, said steering means comprising an inclined rotatable steering column journaled upon said frame and supporting the frame, an element secured to said steering column below said frame and engaging the latter to prevent downward movement of the frame upon the steering column, a substantially horizontal extension secured to the steering column below said element and arranged at an obtuse angle thereto and adapted to move through a conical path when the steering column is turned in either direction away from center, a horizontally swingable steering axle for the vehicle having ground engaging wheels, a sleeve rigidly secured to said axle near the longitudinal center thereof and extending transversely of the axle and rotatably receiving said steering column extension therein, and means to hold said sleeve against endwise movement relative to said steering column extension.

4. In a child's vehicle or the like, a frame bar including a rear substantially horizontal portion, an elevated forward portion and a depending inclined terminal portion having an opening formed therethrough, rear wheel means supporting said rear horizontal portion of the frame bar, a forward horizontally swingable front steering axle having ground engaging wheels, a substantially horizontal sleeve rigid with said axle and extending substantially at right angles thereto near the longitudinal center thereof, an inclined steering column extending through and journaled in said opening of the inclined terminal frame part, a washer-like element secured to said inclined steering column directly below the inclined terminal frame part and supporting the latter, and an angular extension secured to the lower end of the steering column below said inclined terminal frame part and washer-like element and journaled for rotation within said sleeve.

5. In a child's vehicle or the like according to claim 4, and means carried by said steering column extension and engaging the ends of said sleeve to prevent the same from shifting axially upon said extension.

References Cited in the file of this patent
UNITED STATES PATENTS

| | | |
|---|---|---|
| 1,984,309 | Klatt | Dec. 11, 1934 |
| 2,269,910 | Naab | Jan. 13, 1942 |
| 2,311,424 | Weller | Feb. 16, 1943 |